United States Patent
Huang

[11] Patent Number: 5,349,866
[45] Date of Patent: Sep. 27, 1994

[54] DIGITAL PRESSURE GAUGE

[76] Inventor: Tien-Tsai Huang, No. 4, Lane 30, Wu-Chang St., Pan-Chiao City, Taiwan

[21] Appl. No.: 882,540

[22] Filed: May 13, 1992

[51] Int. Cl.$^5$ .............................................. G01L 9/06
[52] U.S. Cl. .................................... 73/727; 73/729.2; 73/734; 338/4
[58] Field of Search ................. 73/734, 733, 727, 729, 73/729.2

[56] References Cited

U.S. PATENT DOCUMENTS

| | | | |
|---|---|---|---|
| 4,250,759 | 2/1981 | Vago et al. ........................... | 73/723 |
| 4,255,970 | 3/1981 | Van Pottelberg ................. | 73/729 X |
| 4,733,564 | 3/1988 | Gorgé73 ................................ | 729 X/ |
| 5,179,856 | 1/1993 | Huang ................................... | 73/4 R |

Primary Examiner—Richard E. Chilcot, Jr.
Assistant Examiner—Joseph L. Felber
Attorney, Agent, or Firm—Oblon, Spivak, McClelland, Maier & Neustadt

[57] ABSTRACT

A digital pressure gauge includes a casing having a pressure sensitive member which responds when pressure is passed therethrough and a digital display member electrically connected to the pressure sensing member. The gauge includes an insulating rod which engages the pressure sensitive member and which contacts a weight sensing member in response to pressure flowing through an inlet so as to expand the pressure sensitive member.

4 Claims, 9 Drawing Sheets

| SEL1 | SEL0 |     |
|------|------|-----|
| 0    | 0    | PSI |
| 0    | 1    | KPA |
| 1    | 0    | KG  |
| 1    | 1    | BAR |

FIG.7(A)

| RS1 | RS0 |      |      |
|-----|-----|------|------|
| 0   | 0   | 8888 |      |
| 0   | 1   |      | 8888 |
| 1   | 0   | 8888 |      |

DIGITAL PRESSURE GAUGE

BACKGROUND OF THE INVENTION

1. Field of Invention

This invention relates to a pressure gauge, and more particularly to one which shows a measured pressure in digital numbers.

2. Description of the Related Art

Referring to FIG. 1, a Bourdon pressure gauge (1) is shown to comprise a C-shaped pipe (11) of an oval cross-section (see in FIG. 3) through which a pressurized fluid from a fluid inlet (10) can flow. When the pressure inside the pipe (11) is increased, the C-shaped pipe (11) tends to straighten, causing the pipe (11) to straighten, as shown in FIG. 2. The sealed inner end portion (110) of the pipe (11) will impel an end of a connecting rod (121). The other end (124) of the connecting rod (121) in turn rotates a sector gear (122) about a pivot pin (125) so that an indicating needle (102) is rotated by meshing the teeth (123) of the sector gear (122) with a gear (103) of the indicating needle (102). Since the upper casing of the Bourbon pressure gauge has a marking scale (104), the needle (102) will point to the corresponding mark in response to the applied weight.

A drawback of the above-mentioned pressure gauge is that when the indicating needle (102) lies between two marks of the scale, one can not tell the precise weight of an object. When measuring an object, the value of which must be known precisely, such pressure gauge is not desirable.

SUMMARY OF THE INVENTION

Therefore, a main object of the present invention is to provide a pressure gauge which shows the measured weight with digital numbers so that one can know the weight precisely.

A Bourdon pressure gauge of the present invention includes a casing having a C-shaped pipe provided in the casing. The pipe has an inlet end extending out from the casing through which a pressurized fluid can be inserted into the same. A sealed end of the pipe is connected to an end of a impelling arm in the casing. The casing further includes a weight sensing member provided therein and electrically connected to a liquid crystal display member provided on an upper portion of the casing. The weight sensing member can convert an applied force to an electrical signal which is transmitted through an electrical circuit to the LCD in digital numbers.

BRIEF DESCRIPTION OF THE DRAWINGS

Other features and advantages of the present invention will become more apparent in the following detailed description, including drawings, all of which show a non-limiting form of the present invention, and in which:

FIGS. 7(A) and 7(B) show the table of a display member of the pressure gauge of the present invention;

DESCRIPTION OF THE PREFERRED EMBODIMENT

Figure 1:
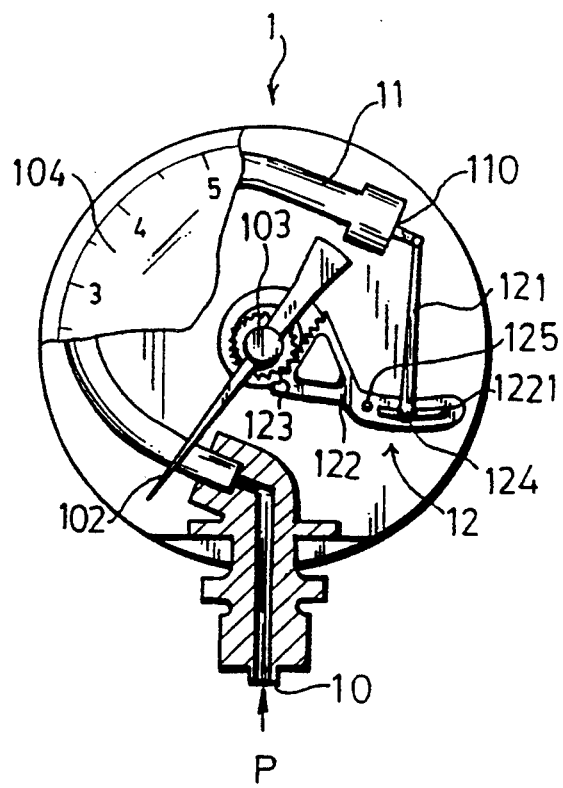
FIG. 1 shows a prior art pressure gauge, a section of which is partially exploded.
Figure 2:
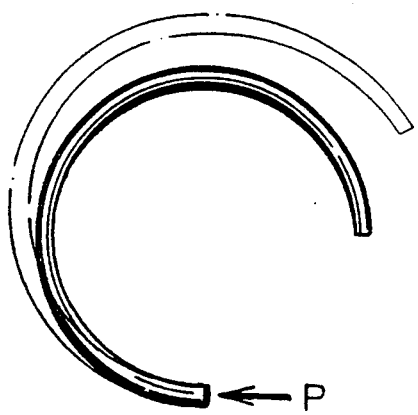
FIG. 2 illustrates a C-shaped pipe employed in the pressure gauge of FIG. 1 with the dotted lines thereof showing the configuration of when being straightened.
Figure 3:
FIG. 3 shows a cross sectional view of a C-shaped pipe employed in the pressure gauge of FIG. 1.
Figure 4:
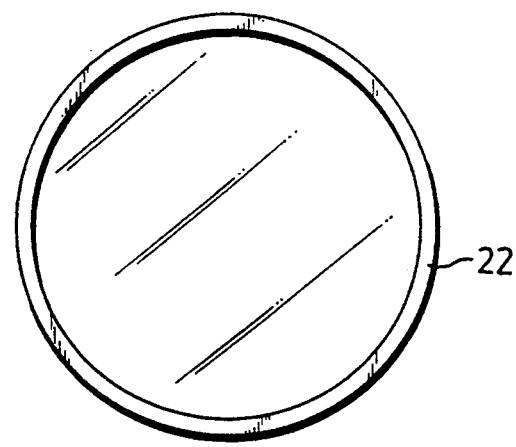
FIG. 4 shows an exploded view of a pressure gauge of the present invention.
Figure 4:
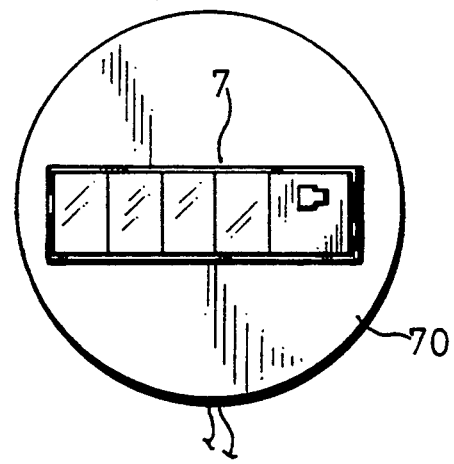
Figure 4:
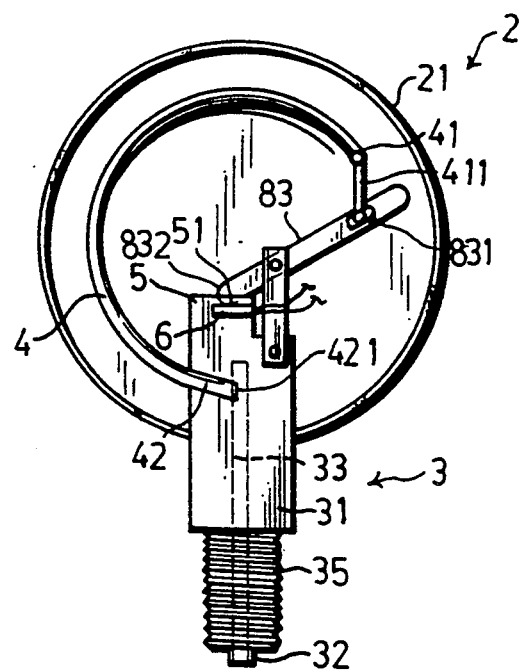
Figure 5:
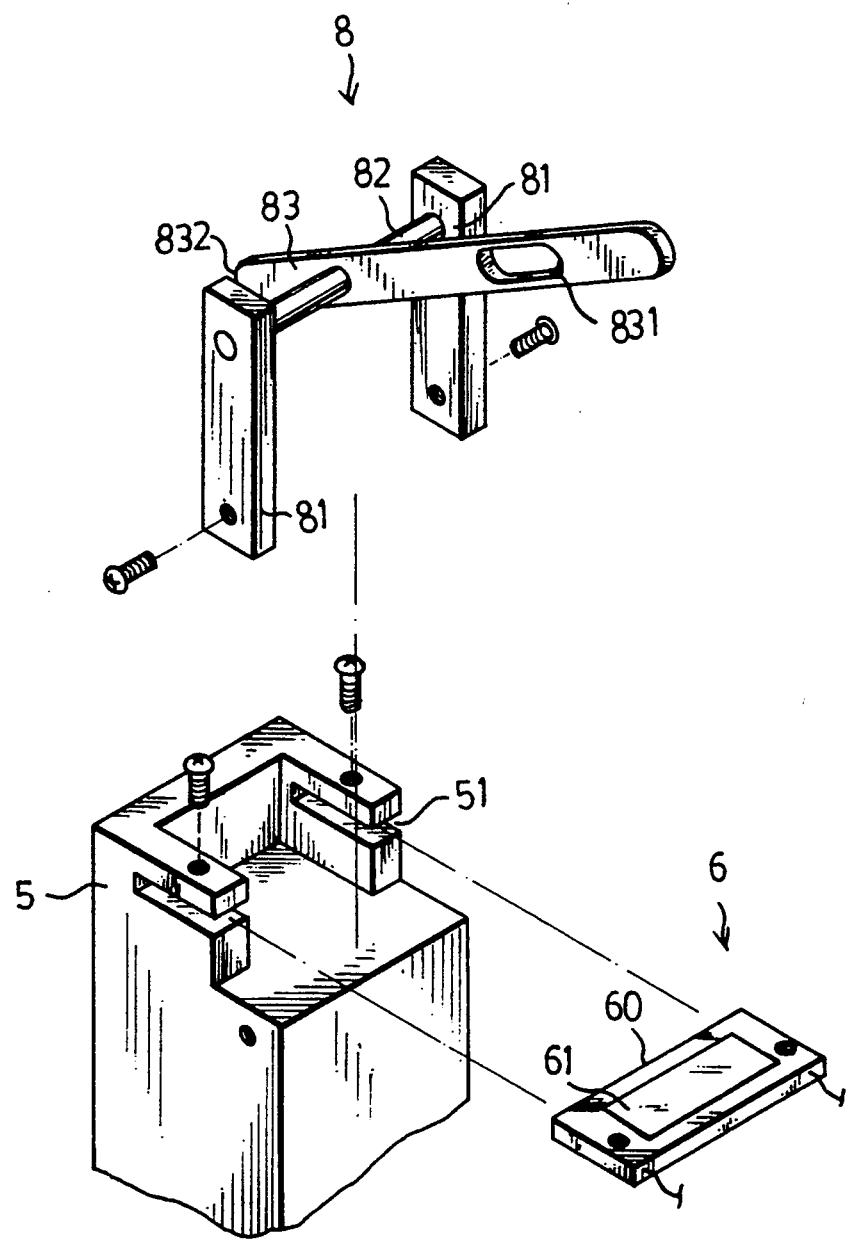
FIG. 5 shows an exploded view of a section of the pressure gauge of the present invention.

Referring to FIGS. 4 and 5, a digital pressure gauge of the present invention is shown to comprise a casing (2), a base support (3), a C-shaped pipe (4), a U-shaped fixing seat (5), a weight sensing member (6), a display member (7) and an impelling mechanism (8).

The casing (2) includes an upper half (22) with a transparent cover (70) and a lower half (21) with a substantial depth. The base support (3) is fixedly secured in the lower half (21) with a section (31) extending out from the lower half. The extending section of the base support (3) has a blind bore (33) with an inlet (32) and an external thread (35) which can be threaded to a valve of a tire, the pressure of which is to be measured.

An open end (42) of the C-shaped pipe (4) is connected to the base support (3) and in communication with the blind bore (33). A sealed end of the C-shaped pipe (4) is connected to an end of a connecting rod (411).

The U-shaped fixing seat (5) is integrally formed with an uppermost section of the base support (3) and has a receiving space (51) for receiving a weight sensing member (6) securely therein by a screw means. The weight sensing member (6) is a thick-film resistor including a resistor layer (60) and a sensing face (61).

The display member (7) is a liquid crystal display electrically connected to the integrated circuit (61).

The impelling mechanism (8) includes two supports (81) fixedly secured on both sides of the base support (3), a transverse rod (82) provided on the two supports (3), and a lever arm (83) rotatably attached to the transverse rod (82). The lever arm (83) has a first end (832) in contact with the resistor layer (60) and a second end (831) movably connected to another end of the connecting rod (411). When a pressurized fluid is inserted into the C-shaped pipe (4) through the inlet (32) of the base support (3), the pipe (4) tends to become straightened, which action will rotate the lever arm (83) about the transverse rod (82), thereby imparting a pressure on the weight sensing member (6). The weight sensing member (6) will generate a signal to the convertor I. C. The annolog signal received by the convertor I. C. is converted into a digital signal. By using a database routine of the convertor I. C., the digital signal is converted into a numerical display signal which is sent to the LCD.

Figure 6:
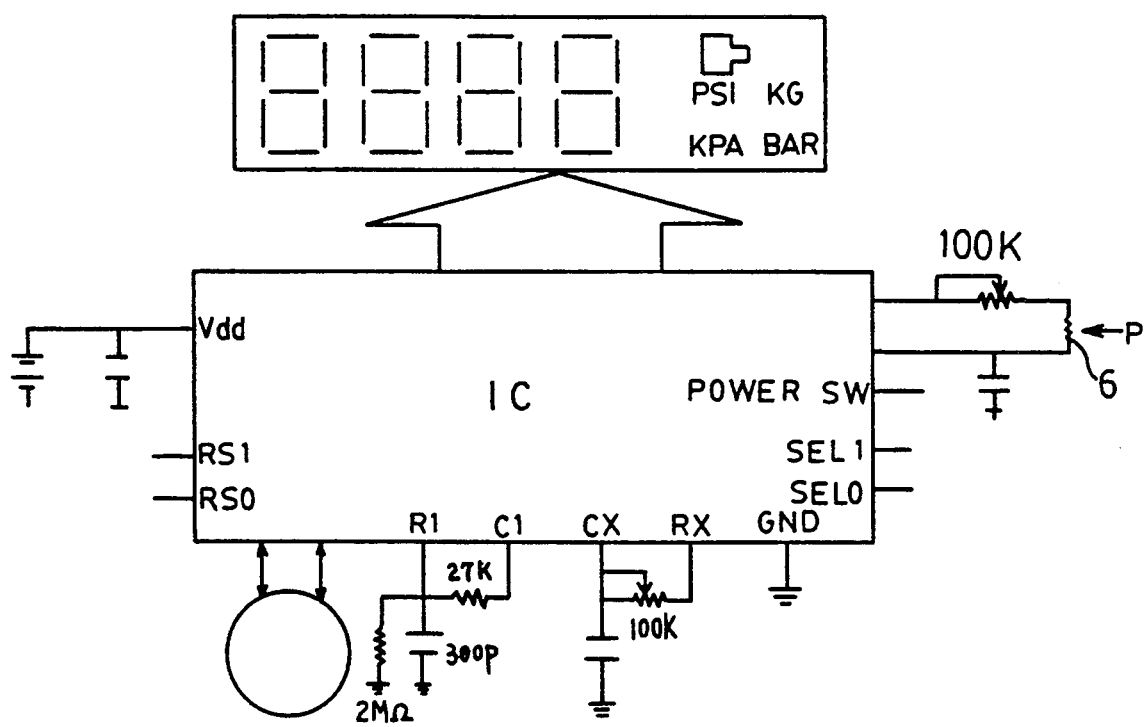
FIG. 6 shows an integrated circuit of a weight sensing member of the pressure gauge of the present invention.

A contact switch may be provided in combination with the Bourdon's tube. When a pressure (P) is applied to the Bourdon's tube, it expands to actuate the contact switch. The contact switch can be therefore serve as a power supply for activating the I. C. Referring to FIGS. 6 and 7, the I. C is provided with two selecting pins (SEL1, SEL0) used in combination with a control circuit to selectively set the units (PSI, KPA, KG and BAR) of the pressure gauge. The I. C can also be provided with two controlled pins (RS1, RS0) which are used in combination with the control circuit to set the decimal point of the display member on the LCD.

The digital pressure gauge of the present invention has the following advantages:

(1) One can easily read the measured weight directly on the display member. An inclination of the viewing point in relation to the indicating needle in the prior art pressure gauge, on the other hand, often leads to an error in reading.

(2) The present invention can provide a wide measuring range since the weight sensing member (6) can detect a pressure of 0 to 1000 psi. The prior art Bourdon gauge, to the contrary, can only detect a pressure of 0 to 300 psi.

Figure 8:
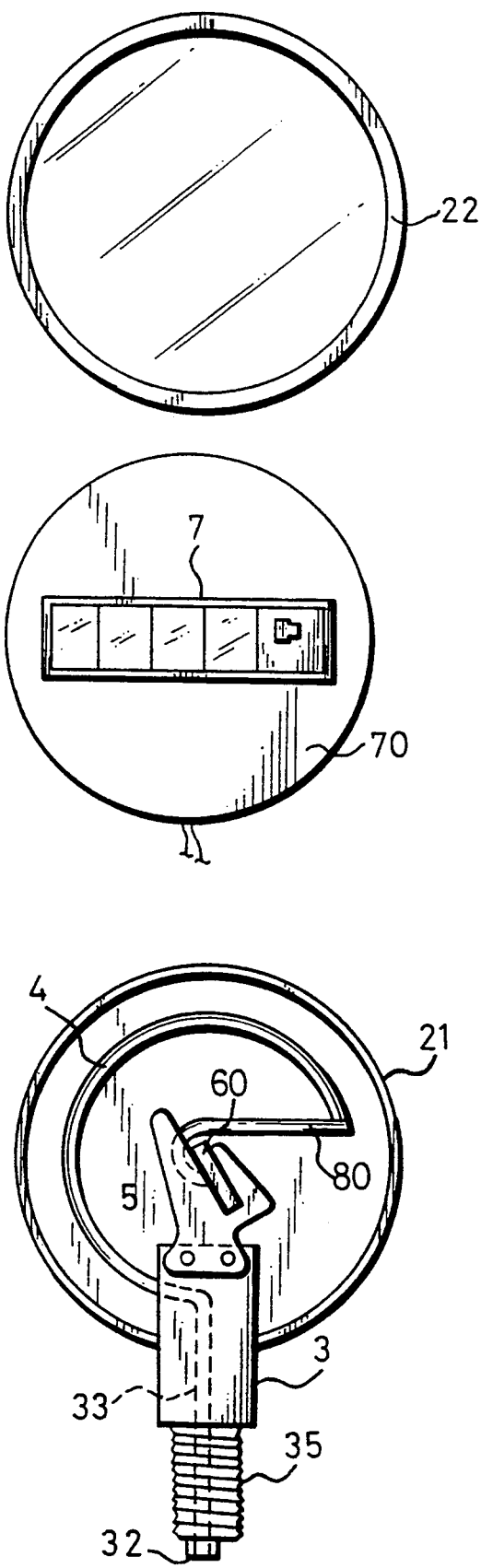
FIG. 8 shows a second preferred embodiment of the pressure gauge of the present invention.
Figure 9:
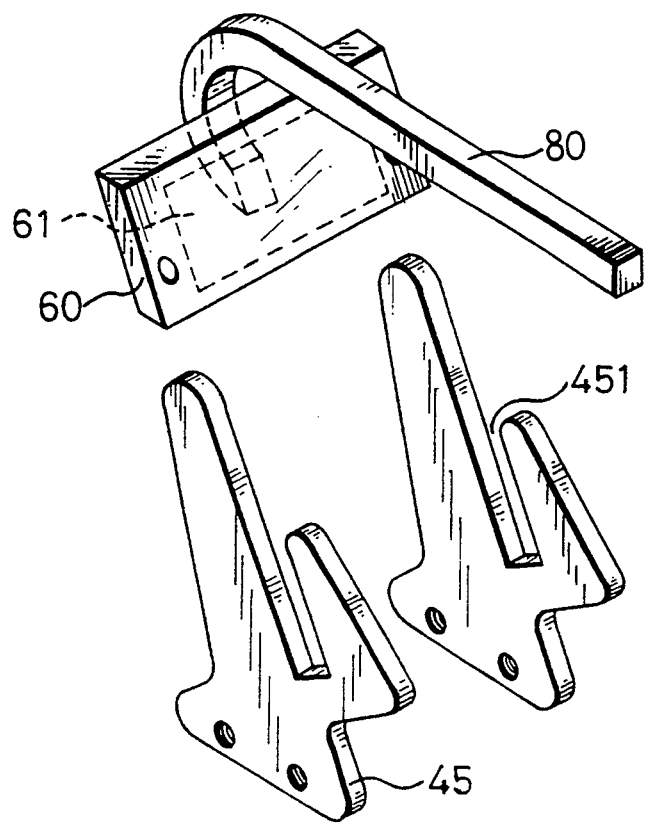
FIG. 9 shows a sectional exploded view of the pressure gauge of the present invention.
Figure 9:
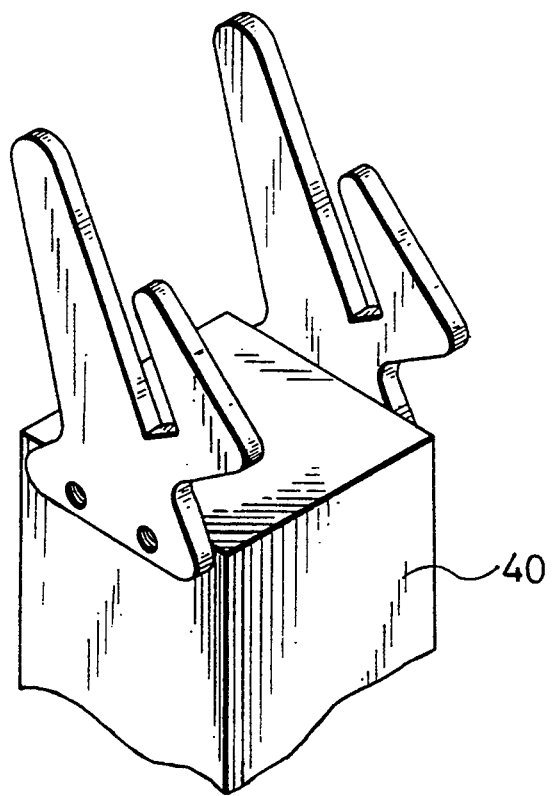

Referring to FIGS. 8 and 9, a second preferred embodiment of the pressure gauge of the present invention is shown with the difference being that the connecting rod (80) has a hook portion which is disposed in a pressing position on the weight sensing member (6). When a pressurized fluid is inserted into the C-shaped pipe (4) through the inlet (32) of the base support (3), the impulse is directly received on the resistor layer (60). Since the sensing member is electrically connected to the LCD as in the previous preferred embodiment, the weight will appear in numerical digital numbers on the display member (7). It is important to note that the construction of the present pressure gauge is simple but that the measurement provided accordingly is accurate and precise.

Figure 10B:
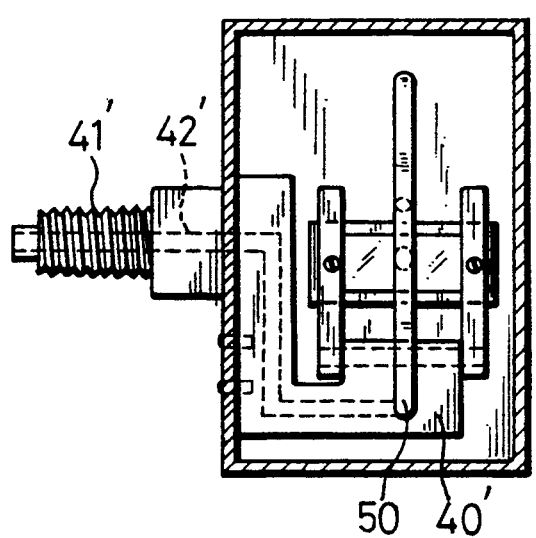
FIGS. 10A and 10B show a third preferred embodiment of the pressure gauge of the present invention.
Figure 10A:
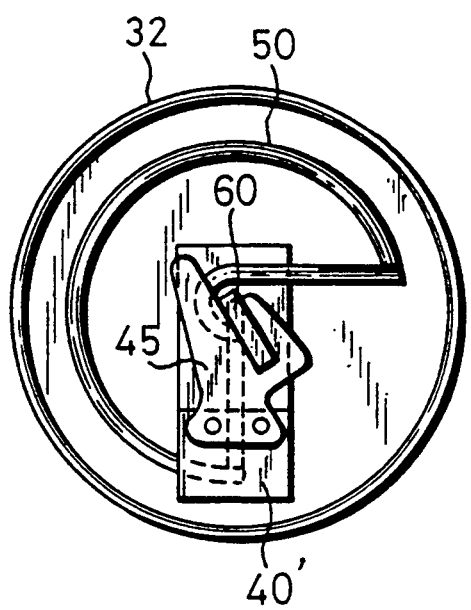

Referring to FIG. 10, the inlet (40') of the pressure gauge of the present invention can also extend from the casing through the bottom of the lower half of the casing but the feature and the object are the same as in the previous embodiment.

Figure 11:
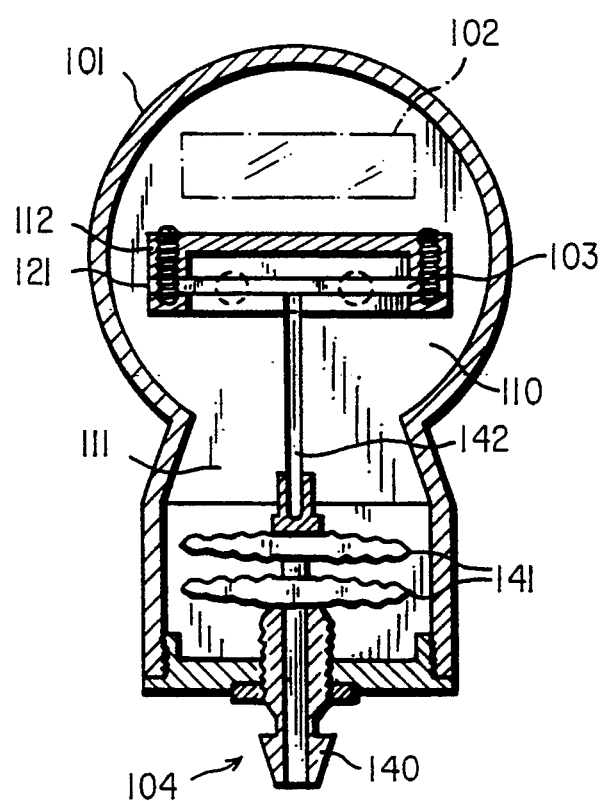
FIG. 11 shows a fourth preferred embodiment of the pressure gauge of the present invention.

Referring to FIG. 11, another preferred embodiment of the present invention is shown which is used as a blood pressure gauge. As illustrated, it includes a casing (101) confining a receiving space (110) therein with an open end (111). A weight sensing member (103) is disposed in a clearance (121) defined by two supports (112) and is electrically connected to a display member (LCD). The open end (111) is threadedly sealed by a seal member (104) through which a valve (140) passes and connects to a diaphragm (141) in the casing (101). The diaphragm (141) is in contact with the weight sensing member (103) through an insulating rod (142). When a pressure increase occurs through the valve (140), the diaphragm (141) expands so as to push the insulating rod (142), producing a result the same as those previous embodiment.

While this invention has been described and illustrated, it will be apparent that many changes and modifications may be made in the general construction and arrangement of the present invention without departing from the spirit and scope thereof. Therefore, it is desired that the invention be limited not to the exact disclosure but only to the extent of the appended claims.

I claim:

1. A digital pressure gauge, comprising:
    a casing having a weight sensing member provided therein and a display member electrically connected to said weight sensing member, said display member displaying a weight sensed by said sensing member in digital numbers; and
    an expandable air pressure sensitive mechanism provided in said casing and having an inlet in communication with the air pressure mechanism;
    an insulating rod for engaging said air pressure sensitive mechanism and which directly contacts said weight sensing member at a point on a surface of the weight sensing member closest to said pressure sensitive mechanism in response to pressure flowing through the inlet so as to expand the pressure sensitive mechanism.

2. A digital pressure gauge as claimed in claim 1, wherein said air pressure sensitive mechanism comprises a diaphragm.

3. A digital pressure gauge as claimed in claim 1, wherein said weight sensing member comprises a thick-film resistor.

4. A digital pressure gauge as claimed in claim 1, wherein said display member comprises a liquid crystal display.

* * * * *